J. CIAMPAGLIA.
BAKING APPARATUS.
APPLICATION FILED MAR. 7, 1913.
1,108,701.
Patented Aug. 25, 1914.
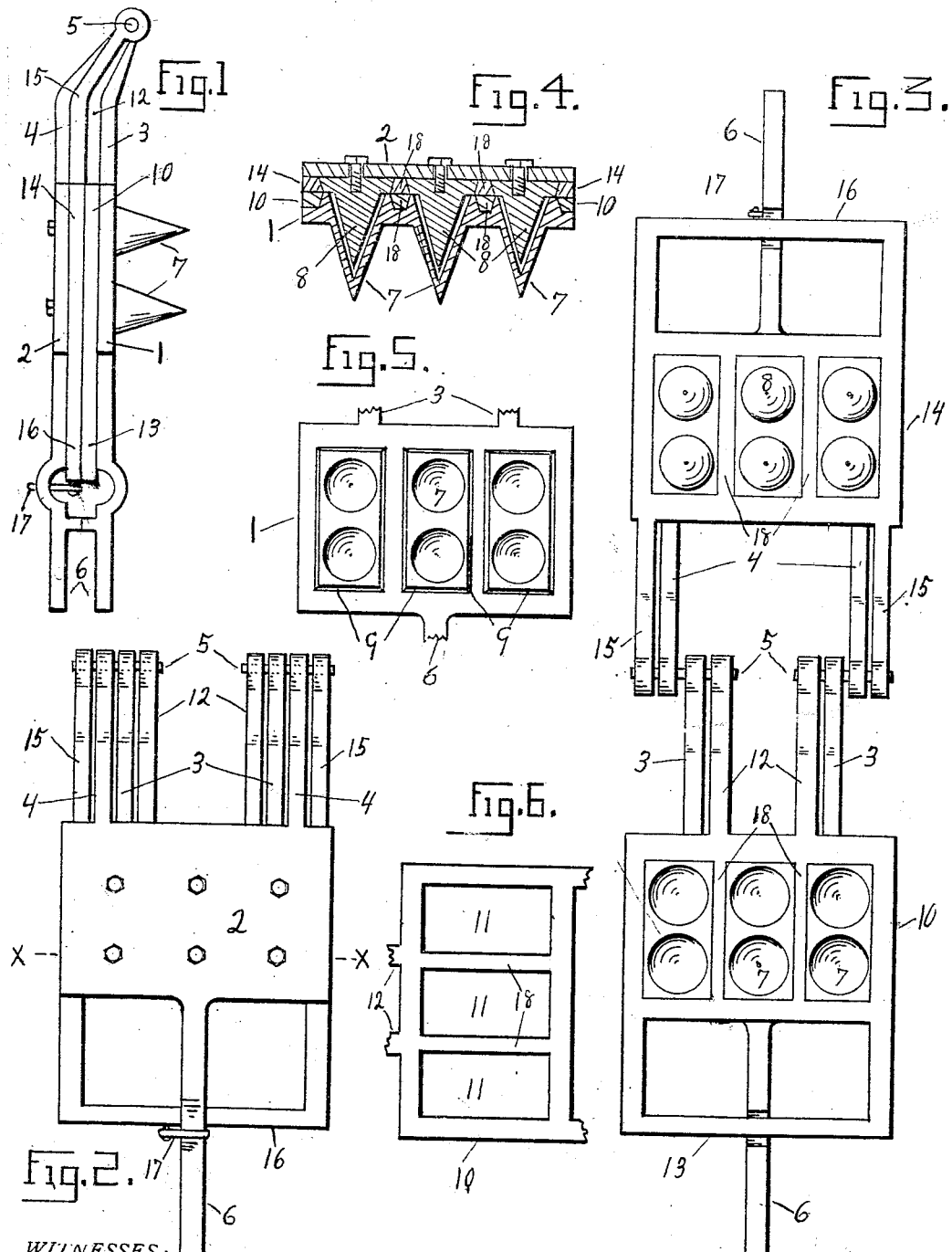
WITNESSES:
J. H. Brady
F. H. Kappa
INVENTOR.
Joseph Ciampaglia
BY
W. B. Munnell
ATTORNEY

UNITED STATES PATENT OFFICE.

JOSEPH CIAMPAGLIA, OF LOUISVILLE, KENTUCKY.

BAKING APPARATUS.

1,108,701.	Specification of Letters Patent.	Patented Aug. 25, 1914.

Application filed March 7, 1913. Serial No. 752,664.

*To all whom it may concern:*

Be it known that I, JOSEPH CIAMPAGLIA, a subject of the King of Italy, residing at 402 East Walnut street, in the city of Louisville, county of Jefferson, and State of Kentucky, have invented new and useful Improvements in Baking Apparatus, of which the following is a specification.

This invention consists of novel apparatus for baking cones, or coronets, in which to dispense ice-cream or similar substances. In apparatus of this character the articles, being cooked, at times stick to one portion or the other of the molds, and time is lost in separating them therefrom, and some loss occasioned by breakage of the articles during removal from the molds.

An object of this invention is to provide apparatus from which the cooked articles may be removed with a minimum of loss and waste.

A further object is to provide apparatus that will be economical of construction, and easy of manipulation.

To this end my invention consists of the novel arrangement of parts hereinafter set forth and illustrated in the accompanying drawing, that forms a part of this specification, in which like reference characters indicate like parts in the different views.

Referring now to that embodiment of my invention illustrated in the drawing, Figure 1 is a side view, and Fig. 2 a plan of the apparatus when closed. Fig. 3 is a plan of the apparatus opened. Fig. 4 a transverse section on line *x—x* of Fig. 2. Fig. 5 is a plan of the matrix plate, and Fig. 6 a plan of one of the stripper-plates.

The apparatus consists of a matrix-plate —1— and a core-plate —2—, each of which is provided with a pair of arms —3, 3— and —4, 4— respectively, projecting from its rear edge and connected by the pintles —5—, and each is provided with a handle —6— projecting from its opposite edge. The plate 1 is provided with a plurality of matrices —7—, the upper plate 2 is provided with a plurality of cores —8—, the cores being adapted to fit in the matrices with a small space between them. When the plates are closed and the faces thereof brought close together, the tops of the matrices are raised above the face of the plate 1 and are provided with beveled edges —9—. A stripper-plate —10— is provided having apertures —11— adapted to fit around and about the tops of the matrices 7, coming flush with the tops thereof. Projecting from the rear edge of the plate 10 are two arms —12, 12— that are connected to the pintles 5, and a handle —13— extends from the forward edge thereof. A similar stripper-plate —14— is disposed about the base of the cores 8, and is provided with arms —15— connected to the pintles 5, and with a handle —16— extending from the front edge thereof. A fastening —17—, secured on the handle 16 is adapted to engage with the handle 6 of the plate 2, in order that the stripper-plate 14 may be raised and lowered in unison with the core-plate.

The operation of my apparatus may now be understood. The upper, or core-plate is raised, as shown in Fig. 3, the dough or batter, which is of the consistency of a thick fluid, is poured from a container, that may be provided with one or more spouts for depositing the required quantity, either successively or simultaneously in each of the matrices or molds 7. The plates are then closed, the cone, or coronet, being formed by the batter being pressed into the space between the core and the matrix. The apparatus is then subjected to a suitable degree of heat, from any desirable, or available, source. It is not possible to place in the molds the exact amount of batter necessary to fill the space between them and the cores, and a quantity will spread over the face of the molds and the top of the stripper-plate forming a sheet that unites the cones, in the various molds, into one body. When the dough is properly baked the source of heat is removed and the upper or core-plate raised, and with it the stripper-plate 14. If now it is found that the cones have remained in the matrices they can readily be removed therefrom by raising the stripper-plate 10, the bars 18 thereof acting against the sheet of material connecting the cones. If on the other hand the cones have stuck to the cores, by releasing the fastening 17, the stripper-plate 14 may be brought forward and the bars 18 pressing against the sheet of material connecting the cones will strip the cones off of the cores.

Having thus described my invention so that any one versed in the art pertaining thereto may make and use the same, I claim:—

1. A baking apparatus comprising a matrix-plate, a core-plate and stripper-plates disposed on the aforesaid plates, hinge arms on the rear of and in proximity to each end of each of said plates, said arms extending in parallel planes, those adjacent the respective ends being connected by a common pivot pin.

2. A baking apparatus comprising a matrix-plate, a core-plate a stripper-plate disposed on each of the aforesaid plates, hinge arms on the rear of and in proximity to each end of each of said plates, said arms extending in parallel planes, those adjacent the respective ends being connected by a common pivot pin, handles extending forward from each of said plates, said core-plate and associated stripper-plate adapted to be raised separately or in unison.

3. A baking apparatus of the character described, a matrix and a core-plate in hinged relationship, a stripper-plate associated with each of said plates and hinged coincidently therewith in such relationship thereto that either stripper-plate may be separated from its associated plate.

JOSEPH CIAMPAGLIA.

Witnesses:
 W. B. MUNNELL,
 J. HENRY BRADY.